United States Patent
Clarke et al.

(10) Patent No.: US 11,595,384 B2
(45) Date of Patent: *Feb. 28, 2023

(54) DIGITAL IDENTITY NETWORK INTERFACE SYSTEM

(71) Applicant: The Toronto-Dominion Bank, Toronto (CA)

(72) Inventors: Malcolm Clarke, Oakville, CA (US); Brian Andrew Lam, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 169 days.

This patent is subject to a terminal disclaimer.

(21) Appl. No.: 16/919,785

(22) Filed: Jul. 2, 2020

(65) Prior Publication Data

US 2020/0344230 A1 Oct. 29, 2020

Related U.S. Application Data

(63) Continuation of application No. 15/995,770, filed on Jun. 1, 2018, now Pat. No. 10,742,651.

(60) Provisional application No. 62/573,848, filed on Oct. 18, 2017, provisional application No. 62/555,148, filed on Sep. 7, 2017.

(51) Int. Cl.
*H04L 9/40* (2022.01)
*H04L 9/32* (2006.01)
*H04L 9/06* (2006.01)
*G06F 9/54* (2006.01)
*G06F 16/9535* (2019.01)

(52) U.S. Cl.
CPC .......... *H04L 63/0876* (2013.01); *G06F 9/547* (2013.01); *G06F 16/9535* (2019.01); *H04L 9/0637* (2013.01); *H04L 9/3213* (2013.01); *H04L 9/3234* (2013.01); *H04L 63/0853* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 9,734,340 | B1* | 8/2017 | Danielson | G06F 21/45 |
| 10,013,493 | B1* | 7/2018 | Gandhi | G06F 16/9535 |
| 10,091,230 | B1* | 10/2018 | Machani | H04L 67/306 |
| 2008/0147647 | A1* | 6/2008 | Reeb | G06F 16/2423 |
| | | | | 707/999.005 |

(Continued)

*Primary Examiner* — Michael Pyzocha
(74) *Attorney, Agent, or Firm* — Rowand LLP

(57) ABSTRACT

There is a provided a digital identity network interface system that may include a communications module and a processor. The processor may be configured to receive a signal representing a digital identity request, the digital identity request defining one or more scopes associated with the request, at least one of the scopes identifying a data type associated with the request, generate a query based on the scopes by translating at least one of the scopes into a query having a query format associated with a digital identity network, the digital identity network storing data associated with a plurality of users, send a signal representing the query to the digital identity network, send a link to an authorization device, after successful authentication, obtain data associated with the digital identity request from the digital identity network, and release at least some of the data.

27 Claims, 7 Drawing Sheets

(56) References Cited

U.S. PATENT DOCUMENTS

| | | | |
|---|---|---|---|
| 2008/0250021 A1* | 10/2008 | Boys | G06F 16/5838 |
| | | | 707/999.009 |
| 2011/0225143 A1* | 9/2011 | Khosravy | G06F 16/21 |
| | | | 707/769 |
| 2012/0102386 A1* | 4/2012 | Campbell | G06F 16/245 |
| | | | 715/229 |
| 2012/0323950 A1* | 12/2012 | Wilson | G06F 16/25 |
| | | | 707/766 |
| 2013/0185218 A1* | 7/2013 | Hermsdorff | G06Q 10/1053 |
| | | | 705/321 |
| 2014/0222780 A1* | 8/2014 | Wu | G06F 16/2428 |
| | | | 707/722 |
| 2015/0215315 A1* | 7/2015 | Gordon | G06F 21/31 |
| | | | 726/5 |
| 2015/0229630 A1* | 8/2015 | Smith | G06F 16/951 |
| | | | 726/5 |
| 2015/0237053 A1* | 8/2015 | Duggana | H04L 63/10 |
| | | | 726/4 |
| 2015/0370615 A1 | 12/2015 | Pi-Sunyer | |
| 2016/0070758 A1* | 3/2016 | Thomson | G16H 10/60 |
| | | | 707/781 |
| 2016/0316016 A1 | 10/2016 | Arenas et al. | |
| 2017/0140174 A1* | 5/2017 | Lacey | G06Q 20/4016 |
| 2017/0278122 A1* | 9/2017 | Kaehler | G06F 21/32 |
| 2018/0060599 A1 | 3/2018 | Horling et al. | |
| 2018/0167371 A1* | 6/2018 | Gordon | H04L 63/0815 |
| 2018/0204216 A1* | 7/2018 | Jayaram | G06Q 20/405 |
| 2018/0341915 A1 | 11/2018 | Narasimhan | |
| 2018/0373862 A1* | 12/2018 | Feijoo | G06F 21/41 |
| 2021/0182425 A1* | 6/2021 | Shah | G16H 10/60 |

\* cited by examiner

DIGITAL IDENTITY NETWORK INTERFACE SYSTEM

CROSS-REFERENCE TO RELATED APPLICATIONS

This application is a continuation of U.S. patent application Ser. No. 15/995,770 filed on Jun. 1, 2018, which claims the benefit of U.S. Provisional Application No. 62/573,848 filed on Oct. 18, 2017 and U.S. Provisional Application No. 62/555,148 filed on Sep. 7, 2017. The contents of the above-referenced applications are incorporated herein by reference in their entirety.

TECHNICAL FIELD

The present application relates to databases, and, more particularly, to identity providing systems and, even more particularly, to methods and systems which interface with a digital identity network to provide secure release of identity data.

BACKGROUND

There are numerous scenarios in which verification of identity may be required. For example, certain organizations may need to verify identity in order to, for example, satisfy regulations such as know your customer (KYC) and anti-money laundering (AML) regulations. Typically, such organizations rely on conventional methods to identify customers. For example, they may review physical identity documents, such as a passport, driver's license, or another government-issued identity document. Such traditional techniques can be insecure since physical identity documents can be falsified, altered or tampered with. Even legitimate physical identity documents can be lost or stolen, raising the risk of fraud.

Furthermore, verifying identity using physical identity documents typically requires a customer to be physically present at the location of the verifier. Such verification techniques do not allow for remote verification of identity.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
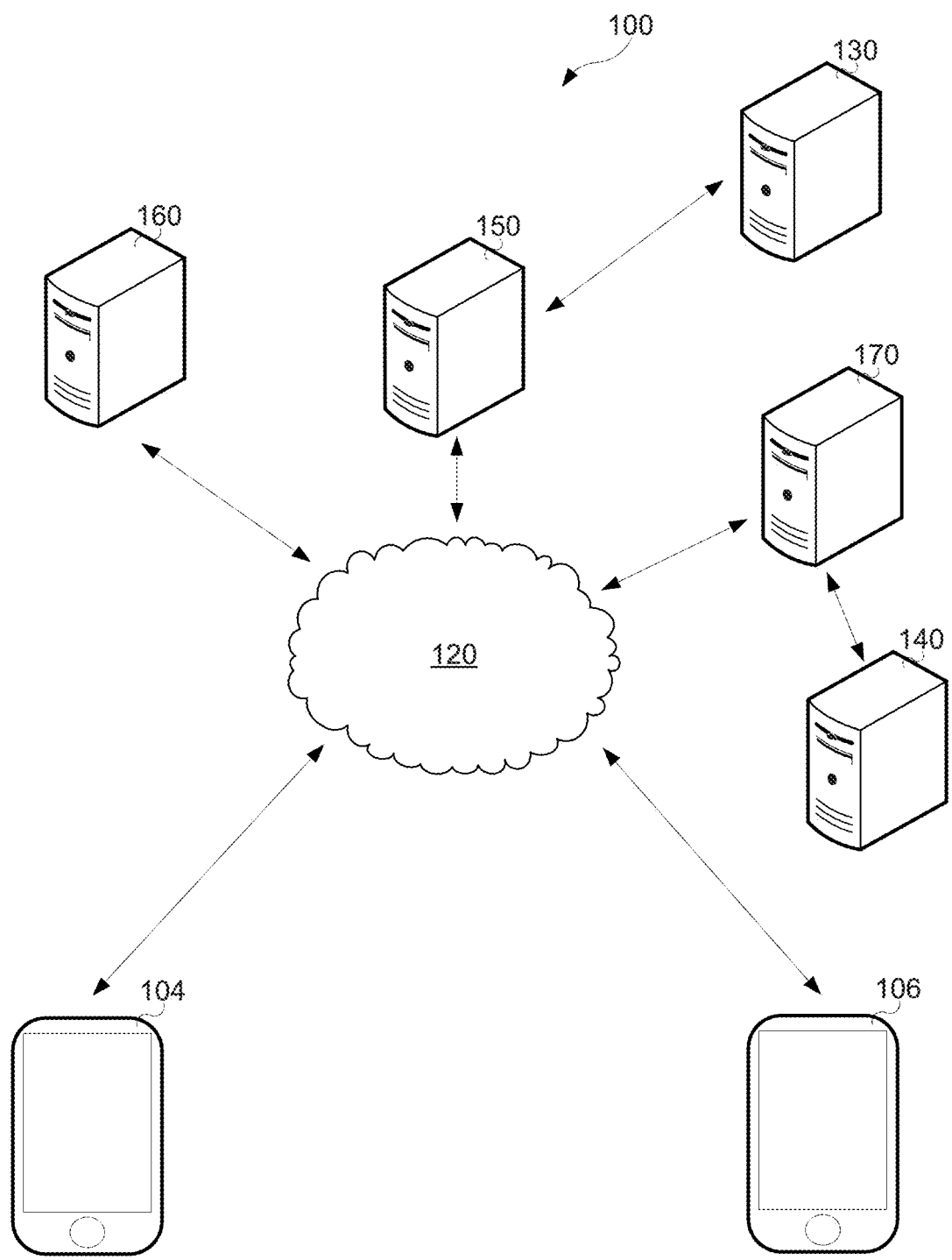
FIG. 1 is a schematic operation diagram illustrating an operating environment of an example embodiment.

In one aspect, there is a provided a digital identity network interface system. The digital identity network interface system includes a communications module and a processor coupled with the communications module. The digital identity network interface system also includes a memory coupled to the processor and storing processor-executable instructions which, when executed by the processor, configure the processor to: receive, via the communications module and from a requesting device, a signal representing a digital identity request, the digital identity request defining one or more scopes associated with the request, at least one of the scopes identifying a data type associated with the request; generate a query based on the scopes by translating at least one of the one or more scopes into a query having a query format associated with a digital identity network, the digital identity network storing data associated with a plurality of users; send, via the communications module, a signal representing the query to the digital identity network; send a link to an authorization device, the link pointing to an online application associated with an authentication provider system; after successful authentication by the authentication provider system, obtain data associated with the digital identity request from the digital identity network; and release at least some of the data associated with the digital identity request to the requesting device.

In another aspect, there is provided a processor-implemented method. The method includes: receiving, from a requesting device, a signal representing a digital identity request, the digital identity request defining one or more scopes associated with the request, at least one of the one or more scopes identifying a data type associated with the request; generating a query based on the scopes by translating at least one of the scopes into a query having a query format associated with a digital identity network, the digital identity network storing data associated with a plurality of users; sending a signal representing the query to the digital identity network; sending a link to an authorization device, the link pointing to an online application associated with an authentication provider system; after successful authentication by the authentication provider system, obtaining data associated with the digital identity request from the digital identity network; and releasing at least some of the data associated with the digital identity request to the requesting device.

In another aspect, there is provided a non-transitory computer readable storage medium comprising computer-executable instructions which, when executed, configure a processor to: receive, from a requesting device, a signal representing a digital identity request, the digital identity request defining one or more scopes associated with the request, at least one of the one or more scopes identifying a data type associated with the request; generate a query based on the scopes by translating at least one of the scopes into a query having a query format associated with a digital identity network, the digital identity network storing data associated with a plurality of users; send a signal representing the query to the digital identity network; send a link to an authorization device, the link pointing to an online application associated with an authentication provider system; after successful authentication by the authentication provider system, obtain data associated with the digital identity request from the digital identity network; and release at least a portion of the data associated with the digital identity request to the requesting device.

Digital identity systems are described below. For example, a permissioned blockchain network may be used to provide a digital identity network. The permissioned blockchain network may only allow blocks to be written to a blockchain by nodes that are granted permission to write to the blockchain. At least some such blocks may be related to digital identity data. For example, at least some blocks may store a private secret, such as a hash of certain identity-related data. The identity-related data may be stored off-chain but the blockchain may be used to effectively provide proof of the data.

A digital identity network interface system allows various other systems to interface with the digital identity network. The digital identity network interface system, which may be referred to as an interface system may, for example, allow a requesting device to request particular data from the digital identity network and may be used to facilitate the authentication of a user. Conveniently, the digital identity network interface system may allow various types of requesting devices to interact with the digital identity network. For example, both non-assisted and assisted type devices may interact with the digital identity network through the same digital identity network interface system. An assisted device is a device that may be used by an operator who is not associated with the digital identity being requested. An assisted device may be used, for example, by a call center operator or another type of operator who is trying to verify the identity of a user. A non-assisted device is a device that is used by the person associated with the digital identity being requested.

Alternatively or additionally, the digital identity network interface system may allow requesting devices to verify identity through the digital identity network without requiring the requesting devices to interact with the digital identity network using a query format that is associated with the digital identity network. Conveniently, the digital identity network interface system may be configured to generate a query for sending to the digital identity network by translating one or more scopes associated with a request received from a requesting device to a query having a query format that is supported by the digital identity network. The translation services provided by the digital identity network interface system may, for example, allow simplification in application design for applications provided on or to the requesting devices.

The digital identity network interface system may cooperate with other components in a digital identity system to ensure that digital identity data is only released after the individual associated with such digital identity data has been authenticated and has confirmed that such digital identity data is to be released. In at least some such embodiments consent information may be stored to act as a log indicating the nature of the consent provided.

Some or all of the above features may be provided by some embodiments.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a block diagram illustrating an operating environment of an example embodiment. Various components cooperate to provide a digital identity system 100 which may be used, for example, to remotely obtain secure identity data about an entity, such as a person.

An electronic device functions as a requesting device 104 and an electronic device functions as an authorization device 106. The requesting device 104 and the authorization device 106 are communicably connected to at least some of the other components of the system 100. For example, the requesting device 104 and/or the authorization device 106 may be coupled to other components through a network 120, which may include a public network such as the Internet and/or a private network.

The requesting device 104 may be any electronic device that issues a digital identity request. The digital identity request is a request for validated identity data from a digital identity network 130. The requesting device 104 may have stored thereon an application, which may be referred to as a requesting application or a consuming application, which includes computer-executable instructions that cause the digital identity request to be issued. Additionally or alternatively, the requesting or consuming application may be an application hosted on a server, such as a web server accessible over the network 120 and the requesting device 104 may access the application over the network 120.

The authorization device 106 may be any electronic device that is associated with a party represented by digital identity data available through the digital identity network 130 (this party may be referred to as the "subject"). The authorization device 106 may be used, by such a party (i.e., by the subject), to input authorization information such as a secret (e.g., a password, a personal identification number, etc.), or other identifying data such as, for example, biometric data such as a fingerprint. As will be described in greater detail below, the authorization information may be used by other components of the system (such as an authentication provider system 140) to authenticate a party as the party that is associated with certain identity data.

The requesting device 104 and the authorization device 106 are computing devices. For example, the requesting device 104 and the authorization device 106 may be desktop or laptop computers. However, one or both of the requesting device 104 and the authorization device 106 may be a computing device of another type such as a personal computer, a tablet computer, a notebook computer, a hand-held computer, a personal digital assistant, a kiosk, a portable navigation device, a mobile phone, a smart phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

As illustrated in FIG. 1, the requesting device 104 and the authorization device 106 may be different devices in some operational scenarios. For example, the requesting device may be associated with an operator or agent that is not the person who is to be identified (i.e., who is not the "subject"). Such a scenario may be referred to as an assisted scenario or channel since an operator who is not the person being identified assists in the identification procedure. An assisted channel might occur, for example, when an operator or agent interacts with the subject. Such interaction may occur in real time and may occur over the phone, in person, over the Internet, etc. For example, the operator or agent associated with the requesting device may be an operator engaging in a telephone chat, Internet chat or in-person chat with the subject. While interacting with the subject, the operator may require verified information about the subject. For example, the operator may require a name, address, driver's license number, account number, birth certificate number, passport number, social insurance number, credit score, height, age, gender, place of birth, or other personal information associated with the subject. Such information may be used, for example, to verify that the subject is eligible for certain services. For example, such information may be used to evaluate the credit-worthiness of the subject, to confirm that the subject is sufficiently old to be legally bound by a contract, or for another purpose.

In other operational scenarios, a single electronic device may provide the functions of both the authorization device 106 and the requesting device 104. Such a scenario may be referred to as a non-assisted scenario or channel since the subject directly interacts with the requesting device without the aid of an operator or agent. The subject may, for example, input instructions into an electronic device which causes the electronic device to interact with a web server hosting the requesting or consuming application. By way of example, it may be that the requesting or consuming application is associated with a service provider, such as a mobile network operator, that the subject wishes to engage or wishes to receive support from. To initialize the service, the service provider may require verified information about the subject. For example, the service provider may require a name, address, driver's license number, account number, birth certificate number, passport number, social insurance number, credit score, height, age, gender, place of birth, or other personal information associated with the subject.

The digital identity system 100 may be used to provide verified information about a subject to a requesting application or consuming application. For example, in some scenarios, such verified information may be delivered to the requesting application using the techniques described below. Verified information about a subject may be referred to as identity data or digital identity data in at least some instances herein.

The digital identity system 100 may also include a digital identity network interface system, which may be referred to as an interface system 150. The interface system 150 is communicably coupled with the digital identity network 130 to allow the interface system 150 to communicate with the digital identity network 130. In the example illustrated, the connection between the digital identity network 130 and the interface system 150 is a direct connection. However, in some embodiments, the interface system 150 may connect to the digital identity network 130 through the network 120. Functions of the interface system 150 will be described in greater detail below.

The digital identity system 100 may include a security token service 160 which is communicably coupled with other components of the digital identity system 100. In the example illustrated, the security token service 160 is coupled to other components via the network 120, but the connection may be direct in other embodiments. As will be described in greater detail below, the security token service 160 may be a server which may, for example, manage an Open ID connect flow to issue identity (ID) tokens that will hold certain requested attributes and may issue access tokens that may be used to allow a system to query an application programming interface (API) with data attributes that are not included in the ID token.

The digital identity system 100 may also include a web application server 170. The web application server 170 serves an online application, which may be referred to as an identity management web application, to the authorization device 106. The online application includes a user interface which allows the authorization device 106 to, for example, indicate their consent to release identity data associated with the subject. The web application server 170 is coupled to the network 120 to allow the authorization device 106 to access the web application server 170 and, more particularly, the online application, through the network 120.

The web application server 170 is communicably coupled with an authentication provider system 140. The authentication provider system 140 may be a system that is associated with a party that is different than the party operating the interface system 150. That is, the authentication provider system 140 and the interface system 150 may be operated by different entities. The authentication provider system 140 is configured to authenticate a subject based on authorization information such as a secret (e.g., a password, a personal identification number, etc.), or other identifying data such as, for example, biometric data such as a fingerprint. The authorization information is input at the authorization device 106 and a representation of the authorization information may then be provided to the authentication provider system 140. The authentication provider system 140 may access stored authorization data (such as a stored secret or stored identifying data) to validate the authorization information input by the subject at the authorization device 106. For example, the authentication provider system 140 may determine that the subject is a particular subject (i.e., a particular individual associated with particular identity data at the digital identity network 130) if the authorization information matches the stored authorization data.

In the example illustrated the web application server 170 is directly coupled with the authentication provider system 140. However, the connection between the web application server 170 and the authentication provider system 140 may also be made via the network 120.

The interface system 150, the web application server 170, the authentication provider system 140 and the security token service 160 are computer systems. Computer systems may be, for example, a mainframe computer, a minicomputer, or the like. Computer systems may include one or more computing devices. For example, a computer system may include multiple computing devices such as, for example, database servers, compute servers, and the like. The multiple computing devices may be in communication using a computer network. For example, computing devices may communicate using a local-area network (LAN). In some embodiments, computer systems may include multiple computing devices organized in a tiered arrangement. For example, a computer system may include middle-tier and back-end computing devices. In some embodiments, a computer system may be a cluster formed of a plurality of interoperating computing devices.

The digital identity network 130 is illustrated with a single block but it may be a network consisting of numerous computer systems. For example, the digital identity network may be a blockchain network which includes a number of nodes. The blockchain network is a decentralized peer-to-peer network in which nodes may maintain respective copies of an append-only ledger.

The blockchain network may be a permissioned blockchain network in which only authorized nodes are permitted to add blocks to the blockchain. For example, only verified nodes may be granted permission to write to the blockchain. The verified nodes may be trusted nodes such as nodes associated with government organizations or other trusted entities such as banks. By way of example, the verified nodes may be associated with a driver's license bureau, a credit bureau, a government identity issuing office such as a passport office or birth registry office, or an office of another type. Given ones of these nodes may maintain identity records of various types. For example, a node associated with a passport office may maintain digital passport records, a node associated with a driver's license bureau may maintain digital licensing records, a node associated with a credit bureau may maintain digital credit records, and a node associated with a bank may maintain digital banking records. Various verified nodes may maintain contact information records which may, for example, specify an email address, postal address, telephone number, or other type of contact information.

Accordingly, at least some verified nodes may write to the blockchain. At least some of the blocks written to the blockchain may be related to digital identity data. The digital identity network 130 may store digital identity data associated with a plurality of users. In at least some embodiments, digital identity data representing personal information may not be included in the blockchain. Instead, the blocks may store a private secret that is related to such digital identity data. The private secret may act as proof to the existence of the digital identity data and may be used to verify the authenticity of the data. For example, in at least some embodiments, the private secret may be a hash of the digital identity data such that, when the digital identity data is provided to another system (i.e., a system apart from the verified node maintaining the digital identity data), it may be verified from the hash stored in a block on the blockchain.

The blockchain network may, for example, be implemented using Hyperledger Fabric, for example. It will, however, be appreciated that the blockchain network may take other forms.

FIG. 1 illustrates an example representation of components of the digital identity system 100. The digital identity system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
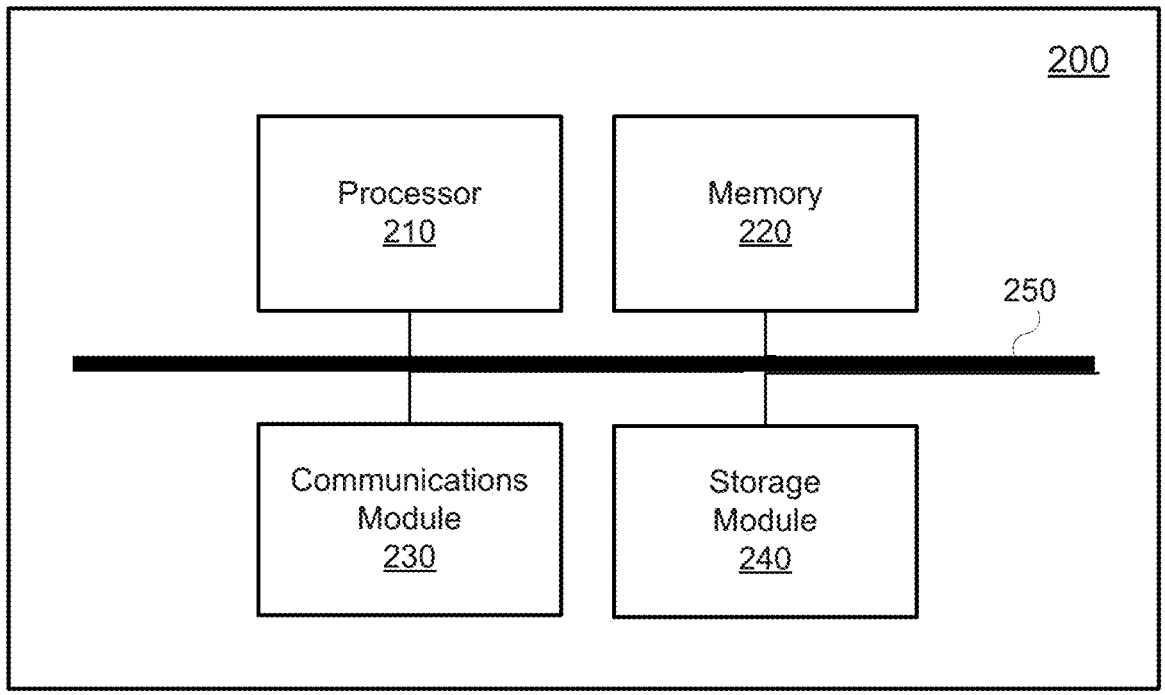
FIG. 2 is a high-level operation diagram of an example computing device.

FIG. 2 is a high-level operation diagram of an example computing device 200. The example computing device 200 may be exemplary of one or more of the security token service 160, interface system 150, requesting device 104, authorization device 106, authentication provider system 140, web application server 170 and the digital identity network 130 (or a portion thereof, such as a node associated with the digital identity network 130).

Each of the security token service 160, interface system 150, requesting device 104, authorization device 106, authentication provider system 140, web application server 170 and the digital identity network 130 (or a portion thereof, such as a node associated with the digital identity network 130) may include software that adapts it to perform a particular function. More particularly, software of each of the security token service 160, interface system 150, requesting device 104, authorization device 106, authentication provider system 140, web application server 170 and the digital identity network 130 (or a portion thereof, such as a node associated with the digital identity network 130) cooperates in order to allow for the distribution of identity data associated with a subject that has input authentication information.

The example computing device 200 includes a variety of modules. For example, as illustrated, the example computing device 200 may include a processor 210, a memory 220, a communications module 230, and a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are each a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computing device 200 to communicate using near-field communication (NFC), via Wi-Fi™, using Bluetooth™ or via some combination of one or more networks or protocols. In some embodiments, all or a portion of the communications module 230 may be integrated into a component of the example computing device 200. For example, the communications module may be integrated into a communications chipset.

The storage module 240 allows data at the example computing device 200 to be stored and retrieved. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally or alternatively, the storage module 240 may access data stored remotely such as, for example, as may be accessed using a local area network (LAN) and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
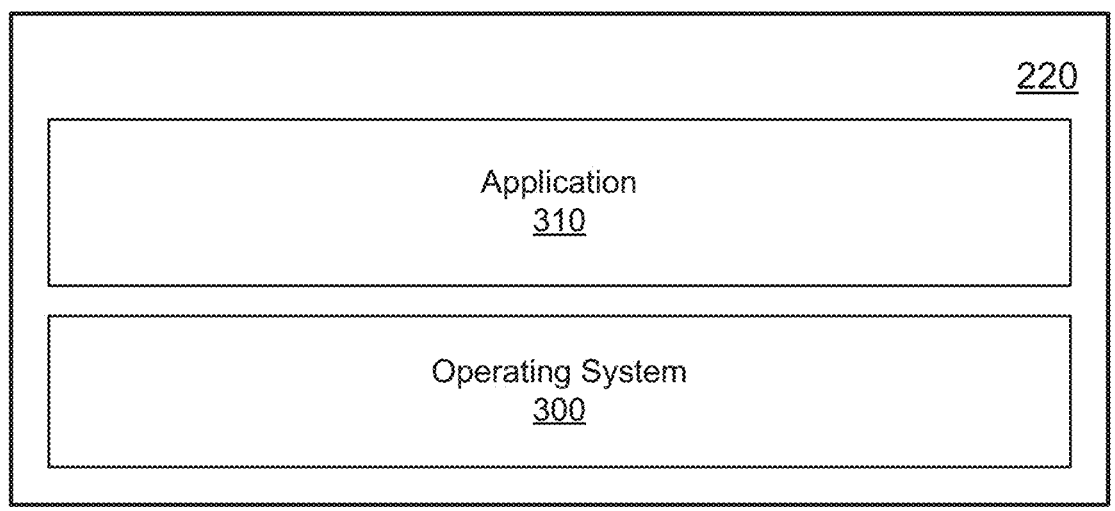
FIG. 3 depicts an example simplified software organization of the example computing device of FIG. 2.

FIG. 3 depicts a simplified organization of software components stored in the memory 220 of the example computer device 200. As illustrated these software components include an operating system 300 and an application 310.

The operating system 300 is software. The operating system 300 allows the application 310 to access the processor 210, the memory 220, and the communications module 230. The operating system 300 may be, for example, UNIX™, Linux™, Microsoft™ Windows™, Apple OSX™ or the like.

The application 310 adapts the example computing device 200, in combination with the operating system 300, to operate as a device to a particular function. For example, the application 310 may cooperate with the operating system 300 to adapt a suitable embodiment of the example computing device 200 to operate as the requesting device 104, the authorization device 106, the interface system 150, the digital identity network 130 (or a node associated with the digital identity network 130), the web application server 170 and/or the authentication provider system 140.

Figure 4:
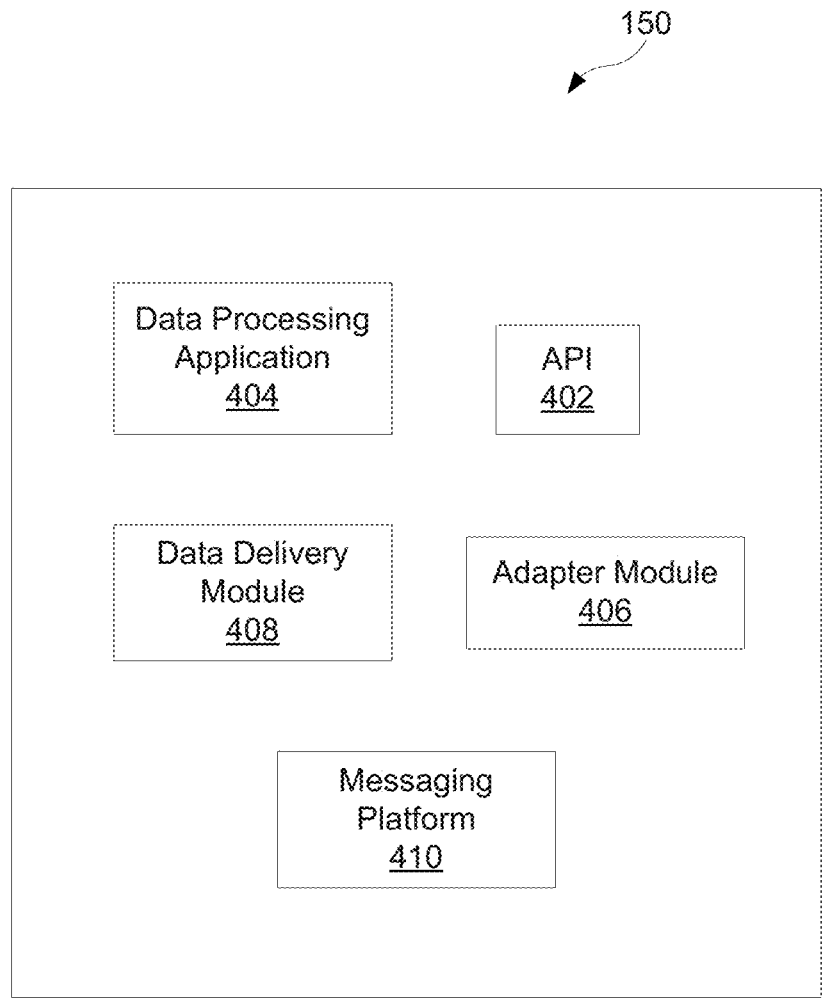
FIG. 4 is a block diagram illustrating example subsystems of the interface system 150.

Referring now to FIG. 4, example components of a digital identity network interface system 150 are illustrated. The example components may represent different physical components or may represent various software modules or both. The digital identity network interface system 150 includes an application programming interface (API) 402. The API 402 is an interface that is configured to receive digital identity requests from requesting devices 104 (FIG. 1). That is, the API 402 provides an interface through which various requesting devices 104 may issue digital identity requests. The API 402 may act on such requests by, for example, generating a query based on the request and sending the query to the digital identity network 130. After a subject has been authenticated at the authentication provider system 140 (FIG. 1), the API 402 may receive identity data from the digital identity network 130 and may release at least some of the identity data to the requesting device 104.

The interface system 150 may include a data processing application 404 which may, for example, include a matching service. In some instances, the digital identity network 130 may include nodes that act as data provider sources and various data provider sources may provide redundant data. For example, a first data provider source may provide an address for a subject and a second data provider source may also provide an address for that subject. The data processing application 404 may be configured to clean identity data to, for example, eliminate or reduce redundancies. The data processing application 404 may, for example, compare identity data from different sources and provide a score or other metric indicating the likelihood of various data sets representing a common subject. By way of example, the data processing application 404 may evaluate whether Joe Smith, Joseph Smith, J P Smith are all the same person. Such evaluation may, for example, consider the level of correspondence between various types of identity data from the various sources. For example, a common email address contained within two different data sets may suggest that the subject associated with each data set is the same.

The interface system 150 may also include an adapter module 406. The adapter module 406 may be a communication module specifically configured for communicating with the digital identity network 130. That is the adapter module 406 may allow the interface system 150 to send data to and receive data from the digital identity network 130.

The interface system 150 may also include a data delivery module 408. The data delivery module is configured to facilitate the delivery of identity data to a requesting or consuming application associated with a requesting device 104. For example, the data delivery module may be configured to deliver identity data received from the digital identity network 130 to the requesting or consuming application through a session application programming interface.

The interface system 150 may also include a messaging platform 410. The messaging platform may be used, for example, when the authorization device 106 is a different device than the requesting device 104. As will be explained in greater detail below, the messaging platform 410 may be used to send a link to the authorization device. The link may, for example, point to an online application that is associated with an authentication provider system 140. For example, the link may point to an online application available from a web application server 170 and the online application may engage an authentication provider system 140 in order to authenticate a user.

Figure 5:
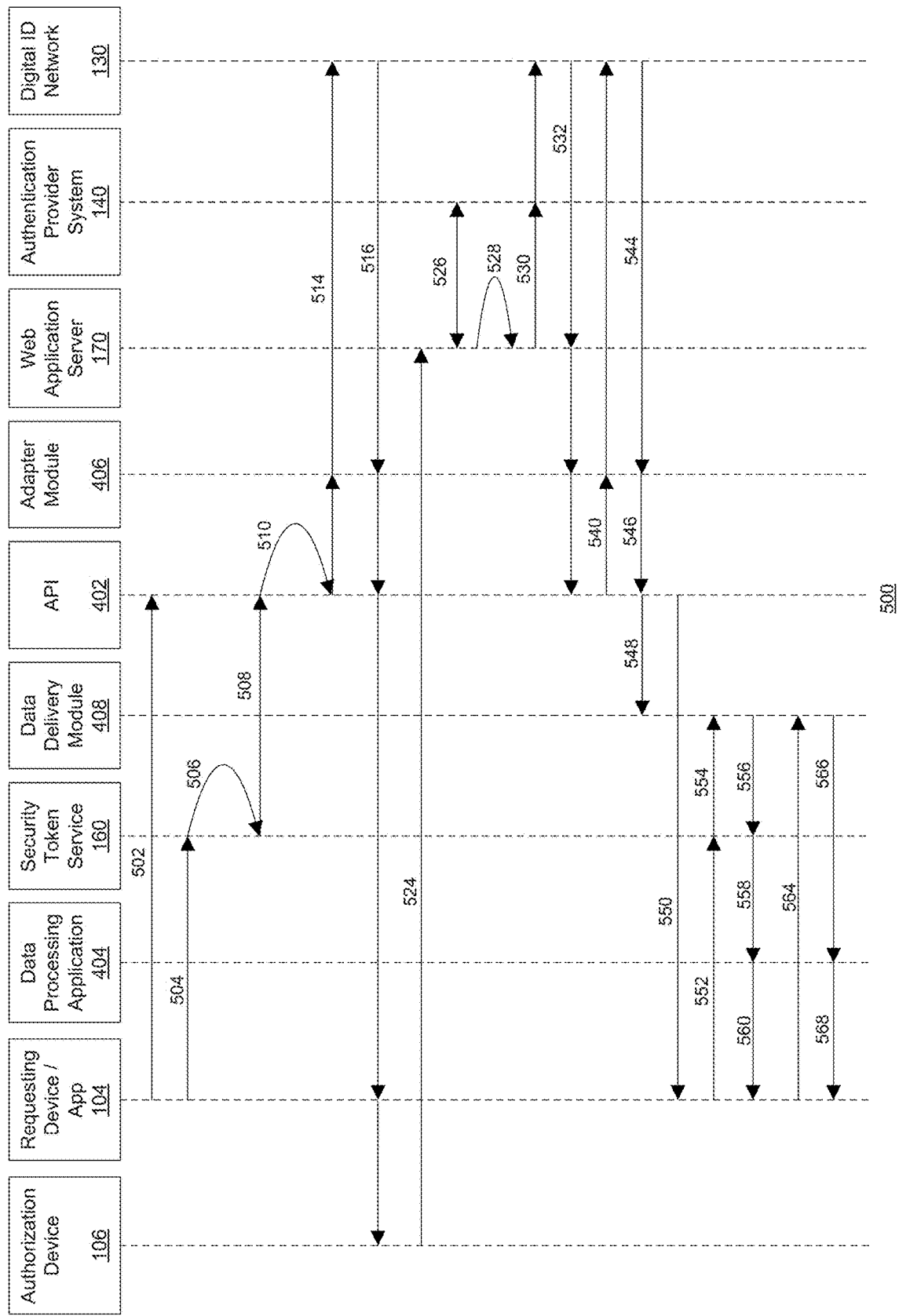
FIG. 5 is a sequence diagram depicting communications that facilitate the provision of identity data, exemplary of an embodiment.

FIG. 5 illustrates a sequence diagram 500, similar to a Unified Modelling Language (UML) sequence diagram, that shows how various components of the digital identity system 100 cooperate to share identity data relating to a subject.

In the following description of the sequence diagram 500, discussion is made of various messages being sent and received. In some embodiments, the exchanged messages may be implemented as messages. However, in other embodiments, some or all of the illustrated messages may not correspond to messages per se but may instead be implemented using techniques such as for example remote procedure call (RPC) and/or web services application programming interfaces (APIs). For example, it may be that the various message pairs illustrated in FIG. 5 correspond, respectively, to an RPC or a web service API call and a reply or callback in response to that call.

The sequence diagram 500 of FIG. 5 illustrates a sequence for a non-assisted channel which may use OpenID Connect (OIDC) and an API. OIDC is an authentication layer on top of the OAuth 2.0 protocol. OAuth 2.0 is a framework to support the development of authentication and authorization protocols.

A non-assisted channel occurs when the authorization device 106 and the requesting device 104 are the same device. While these devices are the same in the non-assisted channel example of FIG. 5, the FIG. 5 has illustrated both of these devices separately to better illustrate the functions that are performed by the device as part of the authorization process and the functions that are performed by the device as part of the data request process.

As illustrated, at the beginning of the sequence a requesting device 104 associated with a requesting application sends a message 502 to the API 402. The message may be referred to as an initialization request. The API 402, in response to receiving the initialization request may cache a context associated with the requesting device 104. For example, a context associated with the requesting application may be stored at the API 402. The context may, for example, define a language used by the requesting application on the requesting device 104 (e.g., whether the requesting application is operating in English). The context may also store an identifier which may, for example, be an identifier of the requesting application.

The requesting device 104 associated with the requesting application sends a message 504 to the API 402 through the security token service 160. The message 504 may be referred to as a digital identity request and the message may include one or more scopes associated with the request. The scopes may include one or more parameters identifying the nature of the request. For example, the one or more scopes may specify the nature of the information that is being sought. For example, the one or more scopes may identify a data type associated with the request. That is, the scopes map to the information (i.e., the identity data) that is required by the requesting device or the requesting application. By way of example, the scopes may specify any one or more of the following data types: a name, address, driver's license number, account number, birth certificate number, passport number, social insurance number, credit score, height, age, gender, place of birth. Other data types may be supported apart from those specifically itemized above. The digital identity request also includes at least some identifying data sufficient to allow the digital identity network 130 to perform a lookup to retrieve relevant identity data. For example, a name and/or contact information associated with the subject may be specified.

The scopes defined in the request may be constrained by a user interface that is provided to the requesting device 104 by the requesting application or by an interface system 150. For example, the requesting application and/or the interface system 150 may provide a user interface to the requesting device which includes one or more interface elements that are configured for receiving input of one or more parameters associated with the request. These parameters may define one or more of the scopes associated with the request. For example, the user interface may allow an operator to select one or more data types which are to be requested. For example, an operator may click "address" to have an address obtained from the digital identity network 130. Thus, the user interface may serve to constrain the scopes that may be included in the digital identity request.

In response to receiving the message 504, the security token service 160 may, at 506, validate the message 504. The validation may, for example, include determining that the requesting application has been pre-authorized to obtain identity data of the type defined by the scopes included in the digital identity request. That is, the security token service 160 may confirm that the requesting application is not requesting identity data of a type that they are not permitted to access. The validation may be performed by retrieving permission information from memory and the permission information may be pre-defined; e.g., when new requesting applications are registered for use with the security token service 160.

Following successful validation of the message 504, the security token service 160 may redirect the request (i.e., the message 504) to the API 402 and this redirected message 508 may then be received at the API 402. The redirect may be a temporary redirect such as a 302 redirect. Thus, a signal representing a digital identity request may be received at an interface system 150 through an API 402 provided by the interface system 150.

At 510 a query is generated by the API 402 based on the requested scopes. More particularly, the query is created by translating at least one of the scopes into a query having a query format associated with the digital identity network 130. The query format associated with the digital identity network 130 may be a non-public format and, in at least some embodiments, the translation provided at the API may assist in maintaining the security of the query format.

A message 514 is sent from the API 402 to the digital identity network 130 through the adapter module 406. The message 514 includes or otherwise represents the query prepared by the API 402 at 510. That is, a signal representing the query is sent from the API 402 to the digital identity network 130 by engaging the adapter module 406 which allows for communications with the digital identity network 130.

Upon receiving the message 514, the digital identity network 130 prepares a link that points to an online application associated with an authentication provider system 140 and sends the link as a message 516 to the authorization device 106. The message may be sent indirectly from the digital identity network 130 to the authorization device 106, passing through the adapter module 406, and the API 402 before reaching the authorization device 106. The link may be a uniform resource locator (URL) associated with an online application on the web application server 170.

After receiving the message 516 which includes the link, the authorization device 106 may display the link to allow the link to be selected and activated using an input device associated with the authorization device 106. After the link is selected or otherwise activated, a message 524 may be sent from the authorization device 106 to the web application server 170. More particularly, the link directs the authorization device 106 to an online application, which may be referred to as a digital ID web application. The digital ID web application may be configured to, for example, provide to the authorization device 106 a user interface. The user interface may, for example, display information associated with using the digital ID web application; for example, an end user license agreement, terms and conditions, a privacy policy, etc. The user interface may, in at least some embodiments, include a selectable option for inputting a selection of an authentication provider. For example, the user interface may present a plurality of authentication providers and the user may be permitted to select an authentication provider for which they have previously registered. Delivery of the user interface and the receipt of input via the user interface will include various messages that are not specifically illustrated in FIG. 5.

A message 526 may be sent from the web application server 170 to the authentication provider system 140. More specifically, the authorization device 106 is directed to an authentication provider system 140 to authenticate the user of the authorization device 106. In embodiments in which an option to select a service provider was provided and such input was received, the authorization device is directed to the authentication provider system 140 associated with the selected service provider. While not illustrated in FIG. 5, after the message 526 is sent to the authentication provider system 140, the authentication provider system 140 may interact with the authorization device 106 to allow the authorization device 106 to provide authorization information, which may also be referred to as credentials, to the authentication provider system 140. For example, one or more messages that are not specifically illustrated in FIG. 5 may be sent between the authorization device 106 and the authentication provider system 140.

In at least some embodiments, the authentication provider system 140 is associated with or operated by a different entity than the online application and/or the interface system

150 which provides the API 402. For example, the authentication provider system 140 may store authentication information, such as credentials, that are unavailable to the interface system 150. This allows the online application to authenticate a user using credentials that are unavailable to the interface system 150. Such authentication is provided using the authentication provider system 140.

During authentication, messages may occur in both directions between the web application server 170 and the authentication provider system 140. For example, after the subject has been successfully authenticated, the authentication provider system 140 may return an authentication token to the online application provided at the web application server 170 and the authorization device 106*d* may be directed to the online application once again.

At 528, the online application may prompt the subject, through the authorization device 106, for consent. That is, the online application may prompt the subject for input to the online application indicating consent to release identity data. The prompt may specify the nature of the identity data that is to be released (e.g., a data type associated with the identity data) and/or may identify the requesting application to which the data will be released. For example, an entity that controls the requesting application may be identified.

The user controlling the authorization device 106 (who is now an authenticated user) may provide an input signal to the online application indicating consent to release the identity data at 528. After such consent is received, the consent may be stored in a database and a message 530 may be sent from the digital web application server 170 (e.g., from the online application) to the digital identity network 130. The message 530 may be sent via the authentication provider system 140. The message 530 is a request to the digital identity network 130 to issue a data license for the requesting application to use to fulfil the data request.

In response to receiving the message 530, the digital identity network 130 issues a data license for the requesting application and sends the data license, via a message 532, to the interface system 150 and, more particularly, to the API 402. The data license may pass from the digital ID network to the online application associated with the web application server 170 and then through the adapter module 406 to the API 402.

Then, after receiving the data license (which occurs after successful authentication by the authentication provider system and after consent has been received from the subject), the API 402 obtains the data associated with the digital identity request from the digital identity network 130. For example, the API 402 may send a message 540 that is a request to fulfill the data license, to the digital identity network 130. The message 540 may be sent via the adapter module 406.

In response to receiving the message 540, the digital identity network 130 retrieves the identity data to fulfil the data license. The digital identity network 130 encrypts the identity data and sends the encrypted identity data to the interface system 150 and, more particularly, the API 402. The identity data may be sent to the API in a message 544. The identity data may be sent to the API 402 via the adapter module 406. More particularly, the adapter module 406 may receive the message 544 containing the encrypted identity data and may decrypt the identity data and send the decrypted identity data to the API 402 in another message 546.

After the identity data is received at the interface system (e.g., at the API 402), the API 402 may release at least some of the data to the requesting application. For example, at least some of the identity data may be released to the requesting device 104.

In at least some embodiments, the identity data may be released using a data delivery module 408. For example, the data delivery module 408 may be configured to create a session API which may be used to release the identity data. The session API may be created, for example, when a message 548 is sent to the data delivery module 408. The session API is created to host the decrypted identity data. As will be described in further detail below, the session API may be configured to provide, to the requesting application/requesting device, an identity token that includes at least a portion of the identity data as attributes of the identity token and/or an access token which permits the requesting device to access at least a portion of the data not included as attributes of the identity token. The session API may provide the identity data in this way through communications with the security token service 160.

For example, at message 550 the requesting application/requesting device 104 is notified by the API 402 that the identity data is available. At message 552, the requesting application/device 104 resumes the digital identity request. The message 552 is sent from the requesting application to the security token service 160. In response to receiving the message 552, the token service may obtain the identity data from the data delivery module 408 and, more particularly, the session API. The security token service 160 may do so by issuing a request for the data (message 554) and by then receiving the identity data (which is in decrypted form) from the session API at message 556. The security token service 160 then generates an identity token based on the identity data. The identity token includes at least a portion of the identity data as attributes of the identity token. For example, the identity token may include a standard set of attributes. That is, certain pre-defined default identity data may be included as attributes in the identity token.

In case non-standard identity data may also be required, the security token service 160 may also generate an access token. The access token may permit the requesting device to access at least a portion of the identity data not included as attributes of the identity token. That is, certain identity data that is not of the type defined by the pre-defined defaults may be retrieved using the access token.

At message 558 the identity token and the access token may be provided to a data processing application 404. The data processing application 404 may perform any one or a combination of: 1) validating the data based on predefined criteria; 2) identifying redundancies in the data (which may, for example, involve calculating a match score); 3) mapping the data into a predefined format for the requesting application; and/or sending the validated identity data to the requesting application together with user session or state information. The identity data may be sent to the requesting application/device 104 at message 560. The identity data may be provided together with the access token.

If the requesting device 104 determines that non-standard identity data is required, then at message 564 it may use the access token to request such data. The requested identity data is then sent via a message 566. The requested identity data may pass through the data processing application 404 which may validate such identity data using techniques that are the same as or similar to those used to validate the identity data in the standard attributes of the identity token. Then, at message 568, the validated non-standard identity data is sent to the requesting application/device 104.

Figure 6:
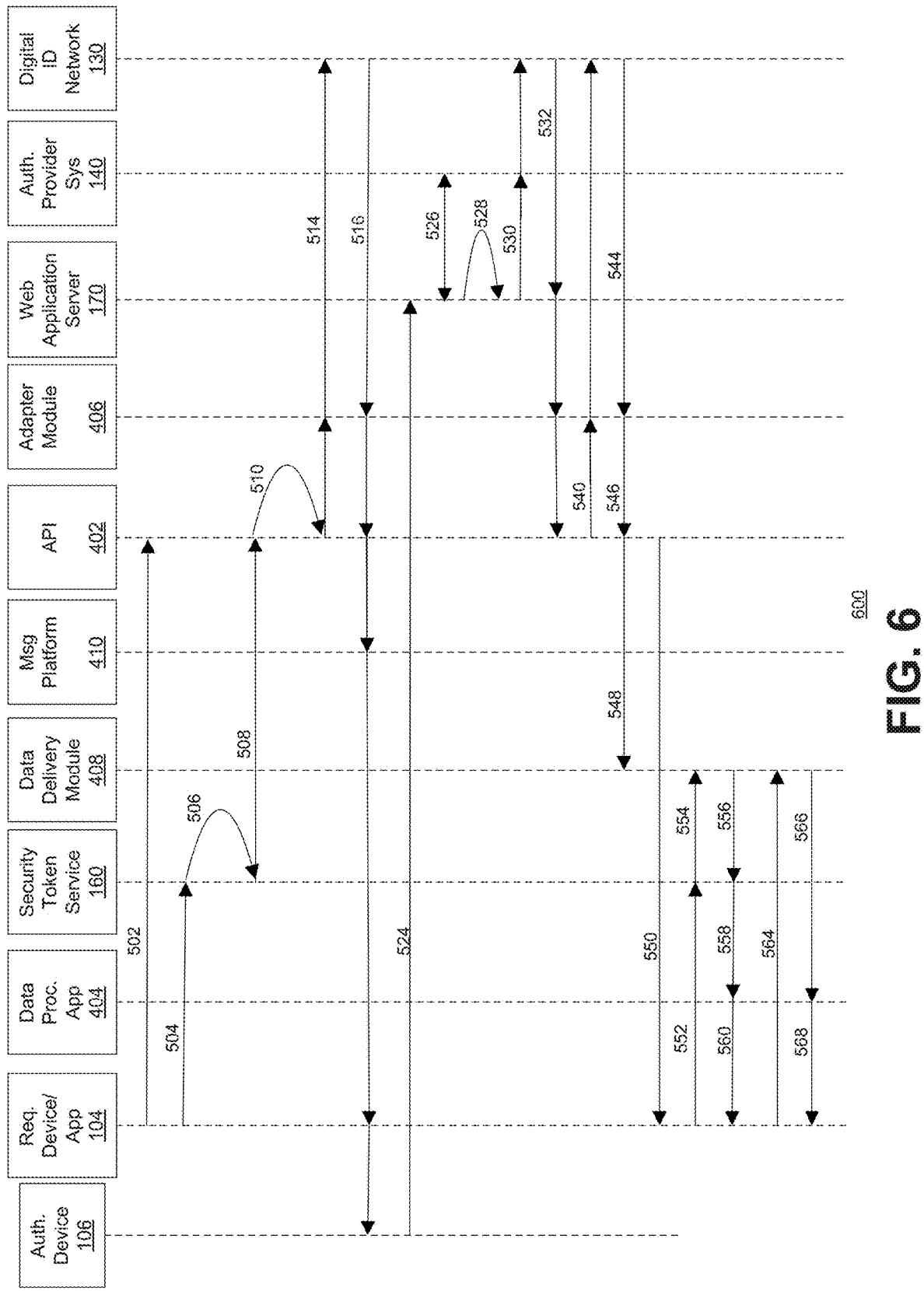
FIG. 6 is a sequence diagram depicting communications that facilitate the provision of identity data, exemplary of an embodiment.

Referring now to FIG. 6, a further sequence diagram is illustrated. The sequence diagram 600 of FIG. 6 illustrates a sequence for an assisted channel which may use OpenID Connect (OIDC) and an API. The sequence diagram 600 of FIG. 6 includes many features in common with the sequence diagram 500 of FIG. 5 and the description of each such feature will not be repeated but common reference numerals are used to illustrate common operations or messages. The sequence diagram 600 of FIG. 6 differs from the sequence diagram 500 of FIG. 5 in that, in the assisted channel illustrated in FIG. 6, the authorization device 106 and the requesting device 104 are different devices. Moreover, the sequence diagram 600 of FIG. 6 includes a messaging platform 410 which is used to communicate the message 516 which include the link to the authorization device 106. The messaging platform 410 may deliver the message 516 by way of a Short Message Service (SMS) message or by way of an email message or in another electronic messaging format. The contact information that is used by the messaging application may be obtained by an operator associated with the requesting device 104 and it may be included in the message 504 that includes the digital identity request.

Figure 7:
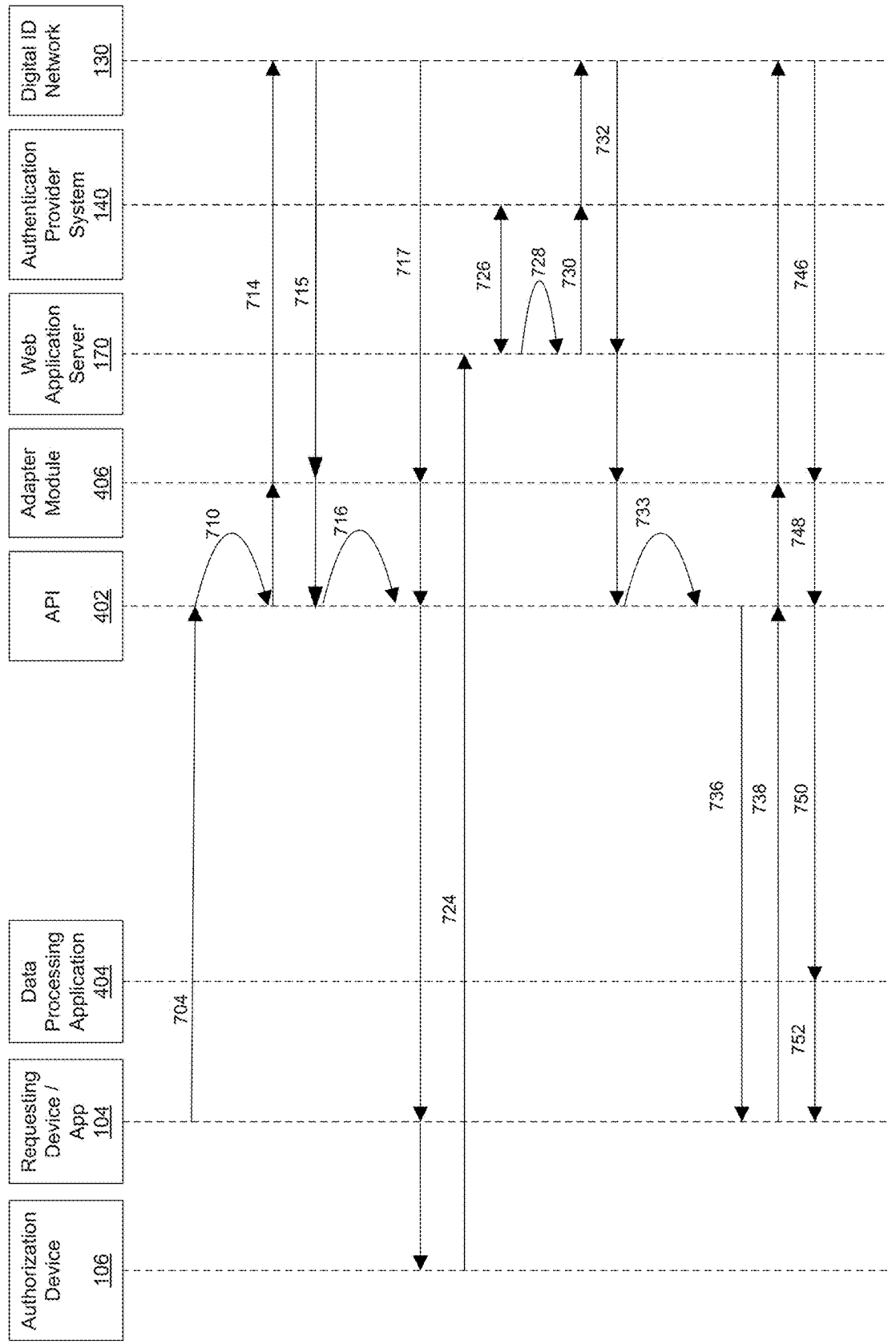
FIG. 7 is a sequence diagram depicting communications that facilitate the provision of identity data, exemplary of an embodiment.

Referring now to FIG. 7, a further sequence diagram is illustrated. The sequence diagram 700 of FIG. 7 illustrates a sequence for an unassisted channel which uses an API but which does not rely on OpenID Connect (OIDC).

Similar to FIG. 5, the sequence diagram of FIG. 7 illustrates the authorization device 106 and the requesting device 104 separately though they are the same device in a non-assisted channel scenario.

As illustrated, at the beginning of the sequence a requesting device 104 associated with a requesting application sends a message 704 to the API 402. The message 704 is similar to the message 504 described above with reference to FIG. 5. However, unlike in the OIDC example of FIG. 5, the message 704 of FIG. 7 may be sent directly from the requesting device 104/application to the API 402 without relying on a security token service 160.

The message 704 may be referred to as a digital identity request and the message may include one or more scopes associated with the request. The scopes may include one or more parameters identifying the nature of the request. For example, the one or more scopes may specify the nature of the information that is being sought. For example, the one or more scopes may identify a data type associated with the request. That is, the scopes map to the information (i.e., the identity data) that is required by the requesting device or the requesting application. By way of example, the scopes may specify any one or more of the following data types: a name, address, driver's license number, account number, birth certificate number, passport number, social insurance number, credit score, height, age, gender, place of birth. Other data types may be supported apart from those specifically itemized above. The digital identity request may also include at least some identifying information (such as a name, address, etc.) sufficient to allow the digital identity network 130 to determine the particular identity data associated with the request.

The scopes defined in the request may be constrained by a user interface that is provided to the requesting device 104 by the requesting application or by an interface system 150. For example, the requesting application and/or the interface system 150 may provide a user interface to the requesting device which includes one or more interface elements that are configured for receiving input of one or more parameters associated with the request. These parameters may define one or more of the scopes associated with the request. For example, the user interface may allow an operator to select one or more data types which are to be requested. For example, an operator may select "address" to have an address obtained from the digital identity network 130. Thus, the user interface may serve to constrain the scopes that may be included in the digital identity request.

The message 704 may also include state information about a state of the requesting application and/or the requesting device. This state information may be used later by the API 402 later to send an appropriate session or state to the requesting application/device when returning identity data.

In response to receiving the message 704, the API 402 may validate the message 704.

Following successful validation of the message 704, at 710 a query may generated by the API 402 based on the requested scopes. More particularly, the query is created by translating at least one of the scopes into a query having a query format associated with the digital identity network 130. The query format associated with the digital identity network 130 may be a non-public format and, in at least some embodiments, the translation services provided at the API may assist in maintaining the security of the query format.

A message 714 is sent from the API 402 to the digital identity network 130 through the adapter module 406. The message 714 includes or otherwise represents the query prepared by the API 402 at 510. That is, a signal representing the query is sent from the API 402 to the digital identity network 130 by engaging the adapter module 406 which allows for communications with the digital identity network 130.

Upon receiving the message 714, the digital identity network may validate the message. Such validation may, for example, evaluate whether the message is in a proper format (e.g., whether it includes a query that is in the proper query format), whether the data that is being requested exists within the digital identity network, or other criteria.

After the message 714 has been validated, the digital identity network returns a message 715 to the API 402 through the adapter module 406. The message 715 may be an acknowledgment message. For example, the message 715 may include a unique identifier associated with the digital identity request. The unique identifier may be an identifier that is unique for the digital identity request. The unique identifier may be used, for example, to maintain an association between various types of data that are associated with the same request. By storing the unique identifier in association with the state information, the state information is mapped to a particular request.

At 716, the API 402 stores data associated with the digital identity request. For example, the API 402 may store state information. Certain information that is received in the message 715 from the digital identity network 130 may also be stored; for example, the unique identifier.

Upon receiving the message 714, the digital identity network 130 also prepares a link that points to an online application associated with an authentication provider system 140 and sends the link as a message 717 to the authorization device 106. The message may be sent indirectly from the digital identity network 130 to the authorization device 106, passing through the adapter module 406, and the API 402 before reaching the authorization device 106. The link may be a uniform resource locator (URL) associated with an online application on the web application server 170. As noted previously, in a non-assisted scenario, the authorization device 106 and the requesting device 104 may be the same device and so the message 71 is received at the requesting device 104.

After receiving the message 717 which includes the link, the authorization device 106 may display the link to allow the link to be selected and activated using an input device associated with the authorization device 106. After the link is selected or actuated, a message 724 may be sent from the authorization device 106 to the web application server 170. More particularly, the link directs the authorization device 106 to the online application, which may be referred to as a digital ID web application. The digital ID web application may be configured to, for example, provide, to the authorization device 106, a user interface. The user interface may, for example, display information associated with using the digital ID web application; for example, an end user license agreement, terms and conditions, a privacy policy, etc. The user interface may, in at least some embodiments, include a selectable option for inputting a selection of an authentication provider. For example, the user interface may present a plurality of authentication providers and the user may be permitted to select an authentication provider for which they have previously registered. Delivery of the user interface and the receipt of input via the user interface will include various messages that are not specifically illustrated in FIG. 7.

A message 726 may be sent from the web application server 170 to the authentication provider system 140. More specifically, the authorization device 106 is directed to an authentication provider system 140 to authenticate the user of the authorization device 106. In embodiments in which an option to select a service provider was provided and such input was received, the authorization device is directed to the authentication provider system 140 associated with the selected service provider. While not illustrated in FIG. 7, after the message 726 is sent to the authentication provider system 140, the authentication provider system 140 may interact with the authorization device 106 to allow the authorization device 106 to provide authorization information, which may also be referred to as credentials, to the authentication provider system 140. For example, one or more messages that are not specifically illustrated in FIG. 7 may be sent between the authorization device 106 and the authentication provider system 140.

In at least some embodiments, the authentication provider system 140 is associated with or operated by a different entity than the online application and/or the interface system 150 which provides the API 402. For example, the authentication provider system 140 may store authentication information, such as credentials, that are unavailable to the interface system 150. This allows the online application to authenticate a user using credentials that are unavailable to the interface system 150. Such authentication is provided using the authentication provider system 140.

During authentication, messages may occur in both directions between the web application server 170 and the authentication provider system 140. For example, after the subject has been successfully authenticated, the authentication provider system 140 may return an authentication token to the online application provided at the web application server 170 and the authorization device 106 may be directed to the online application once again.

At 528, the online application may prompt the subject, through the authorization device 106, for consent. That is, the online application may prompt the subject for input to the online application indicating consent to release identity data. The prompt may specify the nature of the identity data that is to be released (e.g., a data type associated with the identity data) and/or may identify the requesting application to which the data will be released. For example, an entity that controls the requesting application may be identified.

The subject controlling the authorization device 106 (who is now an authenticated user) may provide an input signal to the online application indicating consent to release the identity data at 728. After such consent is received, the consent may be stored and a message 730 may be sent from the digital web application server 170 (e.g., from the online application) to the digital identity network 130. The message 730 may be sent via the authentication provider system 140. The message 730 is a request to the digital identity network 130 to issue a data license for the requesting application to use to fulfil the data request.

In response to receiving the message 730, the digital identity network 130 issues a data license for the requesting application and sends the data license, via a message 732, to the interface system 150 and, more particularly, to the API 402. The data license may pass from the digital ID network through the adapter module 406 to the API 402. The data license may be sent together with the unique identifier so that the data license is associated with a particular request (and can be associated with particular state information that was stored at 716.

Then, after receiving the data license in message 732 (which occurs after successful authentication by the authentication provider system and after consent has been received from the subject), the API 402 may, at 733, retrieve information stored at 716. For example, state information may be retrieved. For example, the state information that is associated with the unique identifier provided with the data license may be retrieved.

Then, the API 402 may notify the requesting application/device of the data license via a message 736. The requesting device/application may then issue a request to fulfil the data license via a message 738. The message 738 is sent from the requesting device/application to the digital identity network 130 through the API 402 and the adapter module 406.

The digital identity network 130, then obtains the data associated with the data license (i.e., the data associated with the digital identity request), encrypts the data and sends it as a message 746 to the interface system 150 and, more particularly, the API 402. The identity data may be sent to the API in a message 746. The identity data may be sent to the API 402 via the adapter module 406. More particularly, the adapter module 406 may receive the message 746 containing the encrypted identity data and may decrypt the identity data and send the decrypted identity data to the API 402 in another message 748.

After the identity data is received at the interface system (e.g., at the API 402), the API 402 may release at least some of the data to the requesting application. For example, at least some of the identity data may be released to the requesting device 104. For example, a message 750 containing the identity data may be sent to the data processing application 404. The data processing application 404 may perform any one or a combination of: 1) validating the data based on predefined criteria; 2) identifying redundancies in the data (which may, for example, involve calculating a match score); 3) mapping the data into a predefined format for the requesting application; and/or sending the validated identity data to the requesting application together with user session or state information. After the data processing application 404 has processed the identity data, the identity data may be sent to the requesting application/device 104 at message 752.

The sequence diagram 700 of FIG. 7 may also be modified to operate with an assisted channel. That is, the techniques described with reference to FIG. 7 could also be used where the requesting device 104 and the authorization device 106 are different devices. The API flow which does not rely on OIDC can, therefore, be used with both assisted and non-assisted channels. For example, techniques similar to those described above may be used to allow the authorization device 106 to take part in the protocol. A messaging platform 410 may deliver the message 717 by way of a Short Message Service (SMS) message or by way of an email message or in another electronic messaging format. The contact information that is used by the messaging application may be obtained by an operator associated with the requesting device 104 and it may be included in the message 704 that includes the digital identity request.

Any steps or operations described herein as being performed by the digital identity network may be performed by a node or other computing device associated with the digital identity network. For example, the digital identity network 130 have an associated access point (such as an associated server) for receiving various messages described herein.

Figure 8:
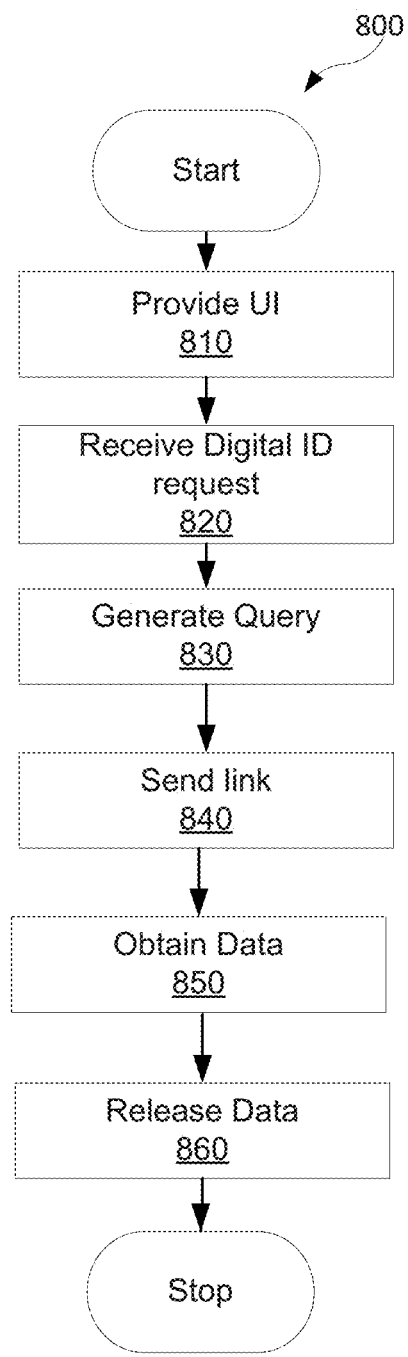
FIG. 8 is a flowchart depicting example operations performed by an interface system.

Reference will now be made to FIG. 8 which illustrates a flowchart of a method 800. Operations 810 and onward are performed by one or more processors of a computing device, such as, for example the processor 210 of a suitably configured instance of the example computing device 200, executing software such as, for example, a suitable instance of the application 310. The method 800 may be performed by the interface system 150; for example, the method 800 may represent operations associated with the API 402.

At the operation 810, the interface system 150 may provide a user interface to a requesting device 104. The user interface may include one or more interface elements configured for receiving input of one or more parameters. For example, the user interface may include one or more interface elements which prompt an operator or user to input certain parameters associated with a digital identity request. For example, the user interface may allow a user or operator to select one or more types of identity data that is to be requested. The user interface may constrain the types of data that the requesting data is permitted to request.

At operation 820 the interface system receives, via a communication module and from a requesting device, a signal representing a digital identity request. The digital identity request may be received via an API 402 provided by the digital identity network interface system 150. The digital identity request may be of a type described above. For example, the digital identity request may define one or more scopes associated with the request. At least one of the scopes may identify a data type associated with the request. The scopes may define parameters associated with the request and may be constrained by the user interface provided at operation 810. That is, at least some of the parameters associated with the request may have been received via the user interface.

At operation 830, the interface system 150 generates a query based on the scopes by translating at least one of the scopes into a query having a query format associated with a digital identity network. The digital identity network may store data associated with a plurality of users.

At operation 840, the interface system 150 sends, via the communications module, a signal representing the query to the digital identity network 130. The digital identity network 130 may, for example, be a permissioned blockchain network.

As described with respect to the sequence diagrams above, the digital identity network 130 may generate a link and may send it to the interface system 150. The interface system 150 may, at operation 840, send the link to an authorization device. The authorization device may be the requesting device or another device. The link points to an online application associated with an authentication provider system. For example, the link may point to a web application server 170 configured with an online application that is configured to engage the authentication provider system. The link may, for example, be a uniform resource locator (URL) and the online application may be configured to authenticate a user using the authentication provider system using credentials that are unavailable to the digital identity network interface system 150.

While not illustrated in FIG. 8, the interface system 150 may require that a subject associated with an authorization device 106 consent to the release of digital identity data prior to effecting such release. For example, the online application may prompt the user of the authorization device 106 to consent.

After successful authentication by the authentication provider system (and after an input signal to the online application indicating consent is received), at operation 850, the interface system 150 obtains data associated with the digital identity request from the digital identity network and, at operation 860, the interface system 150 releases at least some of the data to the requesting device. In some scenarios, releasing at least some of the data to the requesting device may include creating a session API configured to provide, to the requesting device, an identity token that includes at least a portion of the data as attributes of the identity token. The session API may provide an access token to the requesting device and the access token may permit the requesting device to access at least a portion of the data not included as attributes of the identity token.

As described above, digital identity data may be released after an authenticated user has consented to such release. In at least some such embodiments, consent data may be stored after consent is received. The consent data may, for example, be stored by the online application (e.g., at the web application server 170) or by the interface system 150. The consent data may be stored to indicate information associated with the consent such as, for example, the date the consent was received, identifying information indicating the requesting device that initiated the digital identity request, information identifying the nature of the data associated with the digital identity request, information identifying the specific data released, and/or other information. The consent data may, for example, be available to the subject associated with the digital identity data; for example, through a web application or interface.

In other embodiments, the delivery of the identity data to the requesting device may not involve the session API but may, instead, rely on the delivery techniques described above with reference to FIG. 7.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted certain adaptations and modifications of the described embodiments can be made. Therefore, the above discussed embodiments are considered to be illustrative and not restrictive.

What is claimed is:

1. A digital identity network interface system comprising:
a communications module;
a processor coupled with the communications module; and
a memory coupled to the processor and storing processor-executable instructions which, when executed by the processor, configure the processor to:
provide, via the communications module and to a requesting device, a user interface that includes one or more interface elements for defining one or more scopes associated with a digital identity request, the user interface constraining types of identity data that the requesting device is permitted to request;
receive, via the communications module and from the requesting device, a signal representing the digital identity request, the digital identity request including identifying data of a subject and defining one or more scopes associated with the request;
obtain, via the communications module and from an authorization device associated with the subject, consent to obtain and release the identity data to the requesting device based on a prompt sent to the authenticated authorization device that specifies the one or more scopes and identifies a requesting party operating the requesting device;
in response to obtaining the consent, generate a query based on the scopes by translating at least one of the scopes into a query having a query format associated with a digital identity network, the digital identity network storing data associated with a plurality of users;
send, via the communications module, a signal representing the query to the digital identity network; and
obtain identity data associated with the subject from the digital identity network based at least on the identifying data of the subject and according to the query.

2. The digital identity network interface system of claim 1, wherein the signal representing the query causes the digital identity network to prepare a link and send the link to the authorization device associated with the subject, the link pointing to an online application associated with an authentication provider system.

3. The digital identity network interface system of claim 2, wherein the identity data is obtained after successful authentication of the subject by the authentication provider system.

4. The digital identity network interface system of claim 2, wherein the authorization device includes the requesting device.

5. The digital identity network interface system of claim 2, wherein the link includes a uniform resource locator and wherein the online application is configured to authenticate the subject using credentials that are unavailable to the digital identity network interface system.

6. The digital identity network interface system of claim 2, wherein the identity data is obtained by the digital identity network interface system after the subject has provided an input signal to the online application indicating consent to release the data.

7. The digital identity network interface system of claim 1, wherein the processor-executable instructions further configure the processor to:
release at least some of the identity data associated with the subject to the requesting device.

8. The digital identity network interface system of claim 7, wherein releasing at least some of the identity data associated with the digital identity request to the requesting device comprises:
creating a session application programing interface configured to provide, to the requesting device, an identity token that includes at least a portion of the identity data as attributes of the identity token.

9. The digital identity network interface system of claim 8, wherein the session application programming interface is further configured to provide an access token to the requesting device, the access token permitting the requesting device to access at least a portion of the identity data not included as attributes of the identity token.

10. The digital identity network interface system of claim 1, wherein the digital identity request is received through an application programming interface provided by the digital identity network interface system.

11. The digital identity network interface system of claim 1, wherein the digital identity network includes a permissioned blockchain network.

12. The digital identity network interface system of claim 1, wherein the user interface includes one or more interface elements for receiving input of one or more parameters associated with the digital identity request.

13. The digital identity network interface system of claim 12, wherein the one or more parameters are included in the one or more scopes associated with the digital identity request.

14. A processor-implemented method comprising:
providing, to a requesting device, a user interface that includes one or more interface elements for defining one or more scopes associated with a digital identity request, the user interface constraining types of identity data that the requesting device is permitted to request;
receiving, from the requesting device, a signal representing the digital identity request, the digital identity request including identifying data of a subject and defining one or more scopes associated with the request;
obtaining, from an authorization device associated with the subject, consent to obtain and release the identity data to the requesting device based on a prompt sent to the authenticated authorization device that specifies the one or more scopes and identifies a requesting party operating the requesting device;
in response to obtaining the consent, generating a query based on the scopes by translating at least one of the scopes into a query having a query format associated with a digital identity network, the digital identity network storing data associated with a plurality of users;
sending a signal representing the query to the digital identity network; and
obtaining identity data associated with the subject from the digital identity network based at least on the identifying data of the subject and according to the query.

15. The processor-implemented method of claim 14, wherein the signal representing the query causes the digital identity network to prepare a link and send the link to the authorization device associated with the subject, the link pointing to an online application associated with an authentication provider system.

16. The processor-implemented method of claim 15, wherein the identity data is obtained after successful authentication of the subject by the authentication provider system.

17. The processor-implemented method of claim 15, wherein the authorization device includes the requesting device.

18. The processor-implemented method of claim 15, wherein the link includes a uniform resource locator and wherein the online application is configured to authenticate the subject using credentials that are unavailable to the digital identity network interface system.

19. The processor-implemented method of claim 15, wherein the identity data is obtained by the digital identity network interface system after the subject has provided an input signal to the online application indicating consent to release the data.

20. The processor-implemented method of claim 15, further comprising:
releasing at least some of the identity data associated with the subject to the requesting device.

21. The processor-implemented method of claim 20, wherein releasing at least some of the identity data associated with the digital identity request to the requesting device comprises:
creating a session application programing interface configured to provide, to the requesting device, an identity token that includes at least a portion of the identity data as attributes of the identity token.

22. The processor-implemented method of claim 21, wherein the session application programming interface is further configured to provide an access token to the requesting device, the access token permitting the requesting device to access at least a portion of the identity data not included as attributes of the identity token.

23. The processor-implemented method of claim 15, wherein the digital identity request is received through an application programming interface provided by the digital identity network interface system.

24. The processor-implemented method of claim 15, wherein the digital identity network includes a permissioned blockchain network.

25. The processor-implemented method of claim 15, wherein the user interface includes one or more interface elements for receiving input of one or more parameters associated with the digital identity request.

26. The processor-implemented method of claim 25, wherein the one or more parameters are included in the one or more scopes associated with the digital identity request.

27. A non-transitory computer readable storage medium comprising computer-executable instructions which, when executed, configure a processor to:
provide, to a requesting device, a user interface that includes one or more interface elements for defining one or more scopes associated with a digital identity request, the user interface constraining types of identity data that the requesting device is permitted to request;
receive, from the requesting device, a signal representing the digital identity request, the digital identity request including identifying data of a subject and defining one or more scopes associated with the request;
obtain, from an authorization device associated with the subject, consent to obtain and release the identity data to the requesting device based on a prompt sent to the authenticated authorization device that specifies the one or more scopes and identifies a requesting party operating the requesting device;
in response to obtaining the consent, generate a query based on the scopes by translating at least one of the scopes into a query having a query format associated with a digital identity network, the digital identity network storing data associated with a plurality of users;
send, via the communications module, a signal representing the query to the digital identity network; and
obtain identity data associated with the subject from the digital identity network based at least on the identifying data of the subject and according to the query.

\* \* \* \* \*